(12) United States Patent
Yao et al.

(10) Patent No.: US 9,891,466 B2
(45) Date of Patent: Feb. 13, 2018

(54) LIQUID CRYSTAL DISPLAY PANEL AND FABRICATION METHOD THEREOF

(71) Applicants: Xiamen Tianma Micro-electronics Co., Ltd., Xiamen (CN); Tianma Micro-electronics Co., Ltd., Shenzhen (CN)

(72) Inventors: Shulin Yao, Xiamen (CN); Long Zhang, Xiamen (CN); Ting Zhou, Xiamen (CN); Poping Shen, Xiamen (CN); Zhaokeng Cao, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 124 days.

(21) Appl. No.: 15/006,077

(22) Filed: Jan. 25, 2016

(65) Prior Publication Data

US 2016/0238888 A1   Aug. 18, 2016

(30) Foreign Application Priority Data

Feb. 13, 2015   (CN) .......................... 2015 1 0078175

(51) Int. Cl.
*G02F 1/1333*   (2006.01)
*G02F 1/1337*   (2006.01)
(Continued)

(52) U.S. Cl.
CPC ...... *G02F 1/133528* (2013.01); *G02F 1/1333* (2013.01); *G02F 1/133707* (2013.01);
(Continued)

(58) Field of Classification Search
CPC ............. G02F 1/133528; G02F 1/1333; G02F 1/133707; G02F 1/134309;
(Continued)

(56) References Cited

U.S. PATENT DOCUMENTS 6,417,899 B1   7/2002 Jones et al.
2001/0028422 A1*  10/2001 Tsujimura ......... G02F 1/133528
349/96
(Continued)

FOREIGN PATENT DOCUMENTS

CN   1768293 A   5/2006
CN   101056949 A   10/2007
(Continued)

*Primary Examiner* — Nathanael R Briggs
(74) *Attorney, Agent, or Firm* — Anova Law Group, PLLC

(57) ABSTRACT

A display panel includes a first transparent substrate and a second transparent substrate arranged opposite to the first transparent substrate, and multiple sub-regions arranged in an array, including a first sub-region and an adjacent second sub-region. The display panel also includes a first organic film layer configured on the first transparent substrate and a second organic film layer configured on the second transparent substrate. The first organic film layer and the second organic film layer comprise a polymer doped with a dichroic organic dye. The display panel also includes a first alignment layer configured on the surface of the first transparent substrate facing the second transparent substrate, and a second alignment layer configured on the surface of the second transparent substrate facing the first transparent substrate; and a liquid crystal layer sandwiched between the first transparent substrate and the second transparent substrate.

20 Claims, 13 Drawing Sheets

(51) Int. Cl.
*G02F 1/1335* (2006.01)
*G02F 1/1343* (2006.01)

(52) U.S. Cl.
CPC ............... *G02F 1/134309* (2013.01); *G02F 2001/133357* (2013.01); *G02F 2001/133531* (2013.01); *G02F 2001/133538* (2013.01); *G02F 2201/40* (2013.01)

(58) Field of Classification Search
CPC ........ G02F 2001/133357; G02F 2001/133531; G02F 2001/133538; G02F 2001/133565; G02F 2201/40
See application file for complete search history.

(56) References Cited

U.S. PATENT DOCUMENTS

2002/0163616 A1* 11/2002 Jones ................... G02B 5/3033
349/187
2006/0023143 A1* 2/2006 Lee ....................... G02B 27/26
349/102

FOREIGN PATENT DOCUMENTS

| CN | 101923183 A | 12/2010 |
| CN | 104160326 A | 11/2014 |

* cited by examiner

LIQUID CRYSTAL DISPLAY PANEL AND FABRICATION METHOD THEREOF

CROSS-REFERENCES TO RELATED APPLICATIONS

This application claims priority of Chinese Patent Application No. 201510078175.9, filed on Feb. 13, 2015, the entire contents of which are hereby incorporated by reference.

FIELD OF THE INVENTION

The present disclosure generally relates to the field of display technologies and, more particularly, relates to a liquid crystal display panel and fabrication method thereof.

BACKGROUND

With many advantages, such as light weight and energy saving, flat display panels are liked by consumers, and liquid crystal display (LCD) panels are among the most popular. An LCD panel typically includes an array substrate, a color filter substrate and a liquid crystal layer filled between the array substrate and the color filter substrate. At least one of the array substrate and the color filter substrate is configured with a pixel electrode and a common electrode. By applying an electric voltage between the pixel electrode and the common electrode, an electric field is formed. By controlling the electric field strength, the orientation angle of the liquid crystal molecules may be adjusted, and thus the light transmittance of the backlight may be changed.

According to the operating modes, LCD panels mainly include two types: vertical electric field type, and transverse electric field type. In an LCD panel of the vertical electric field type, an electric field with a direction substantially vertical to the substrate surface is used to drive the liquid crystal layer, and modulate the light incident on the liquid crystal layer for displaying images. The display modes of the vertical electric field type mainly include a twisted nematic (TN) mode and a multi-domain vertical orientation (MVA) mode.

In an LCD panel of the transverse electric field type, an electric field with a direction substantially parallel to the substrate surface is used to drive the liquid crystal layer, and modulate the light incident on the liquid crystal layer for displaying images. The display modes of the transverse electric field type mainly include an in-plane switching (IPS) mode and a fringe field switching (FFS) mode.

Because of their small color shift in different directions, high color reproduction, fast response, high contrast, wide viewing angle and other characteristics, LCD panels of the transverse electric field type are more and more widely used in practical applications. With the development of panel technologies, more display modes, such as single-domain, double-domain and multi-domain display modes, are derived from the transverse electric field type.

Usually the single-domain display mode has a higher transmittance than the dual-domain and multi-domain display modes. However, the dual domain and multi-domain display modes have better viewing angles than the single-domain display mode. It is often difficult to pursue both the viewing angle and the transmittance to obtain liquid crystal display panels with wide viewing angle and high transmittance.

The disclosed structures and manufacturing methods are directed to solve one or more problems set forth above and other problems in the art.

BRIEF SUMMARY OF THE DISCLOSURE

One aspect of the present disclosure includes a display panel. The display panel includes a first transparent substrate and a second transparent substrate arranged opposite to the first transparent substrate, and multiple sub-regions arranged in an array, including a first sub-region and an adjacent second sub-region. The display panel also includes a first organic film layer configured on the first transparent substrate and a second organic film layer configured on the second transparent substrate. The first organic film layer and the second organic film layer comprise a polymer doped with a dichroic organic dye. The display panel also includes a first alignment layer configured on the surface of the first transparent substrate facing the second transparent substrate, and a second alignment layer configured on the surface of the second transparent substrate facing the first transparent substrate; and a liquid crystal layer sandwiched between the first transparent substrate and the second transparent substrate. The first organic film layer and the second organic film layer have a first polarization axis and a second polarization axis in the first sub-region, respectively; the first organic film layer and the second organic film layer have, respectively, a third polarization axis and a four polarization axis in the second sub-region; and the first alignment layer and the second alignment layer have a first orientation direction in the first sub-region, and have a second orientation direction in the second sub-region.

Another aspect of the present disclosure includes a method for manufacturing a display panel. The method includes providing a first transparent substrate and a second transparent substrate, and forming a first organic film layer on the first transparent substrate and a second organic film layer on the second transparent substrate. The first transparent substrate and the second transparent substrate have multiple sub-regions arranged in an array, the multiple sub-regions include a first sub-region and an adjacent second sub-region, and the first organic film layer and the second organic film layer comprise a polymer doped with a dichroic organic dye. The method also includes forming a first alignment layer on the surface of the first transparent substrate facing the second transparent substrate, and a second alignment layer on the surface of the second transparent substrate facing the first transparent substrate; and filling a liquid crystal layer between the first transparent substrate and the second transparent substrate. The first organic film layer and the second organic film layer have a first polarization axis and a second polarization axis in the first sub-region, respectively; the first organic film layer and the second organic film layer have, respectively, a third polarization axis and a four polarization axis in the second sub-region; and the first alignment layer and the second alignment layer have a first orientation direction in the first sub-region, and have a second orientation direction in the second sub-region.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

To make the objectives, technical solutions and advantages of the present invention more clear and explicit, the present invention is described in further detail with accompanying drawings and embodiments. It should be understood that the specific exemplary embodiments described herein are only for explaining the present invention and are not intended to limit the present invention.

Reference will now be made in detail to exemplary embodiments of the disclosure, which are illustrated in the accompanying drawings. Wherever possible, the same reference numbers will be used throughout the drawings to refer to the same or like parts.

Figure 1A:
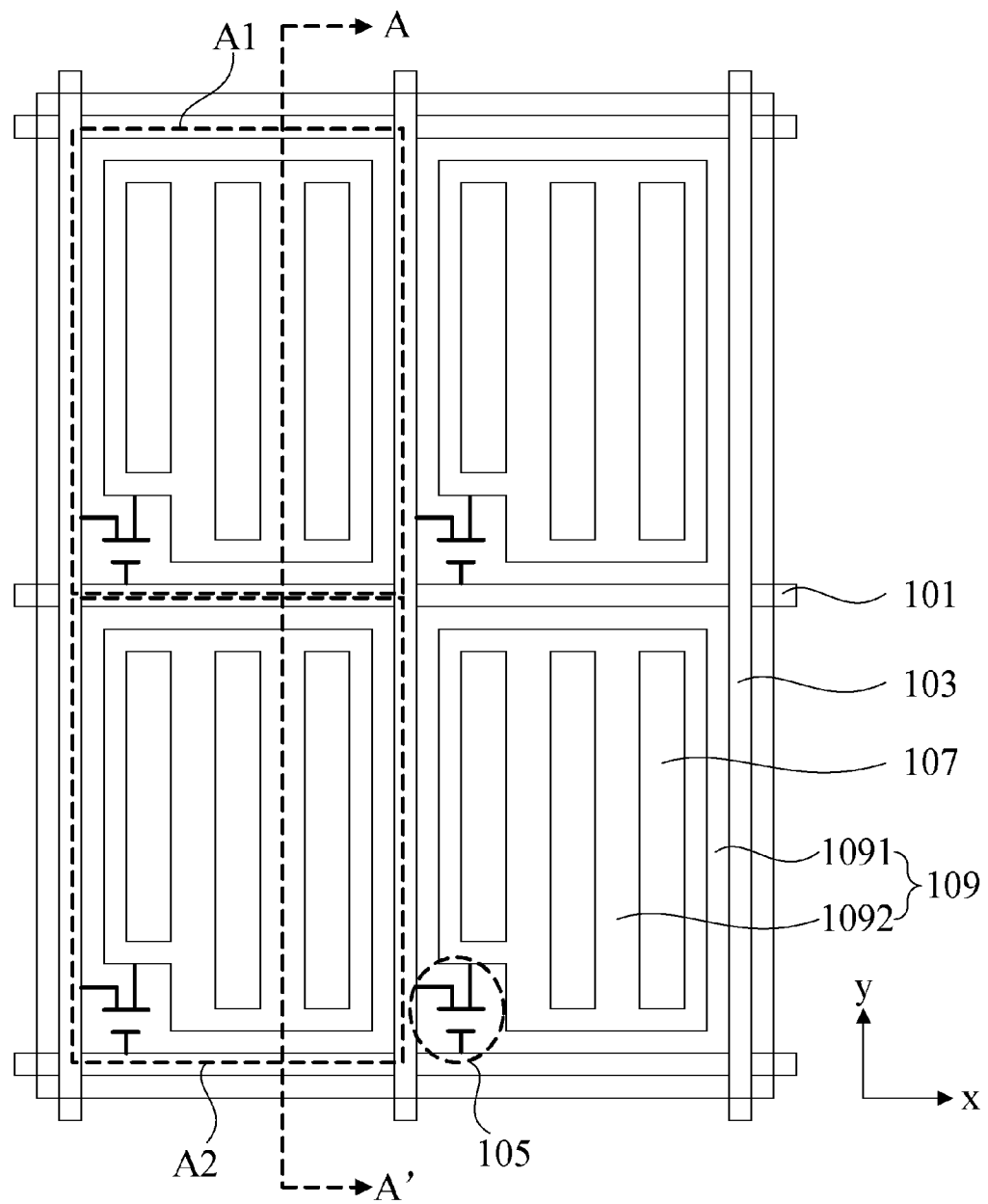
FIG. 1A illustrates a top view of an exemplary liquid crystal display panel consistent with the disclosed embodiments.
Figure 1B:
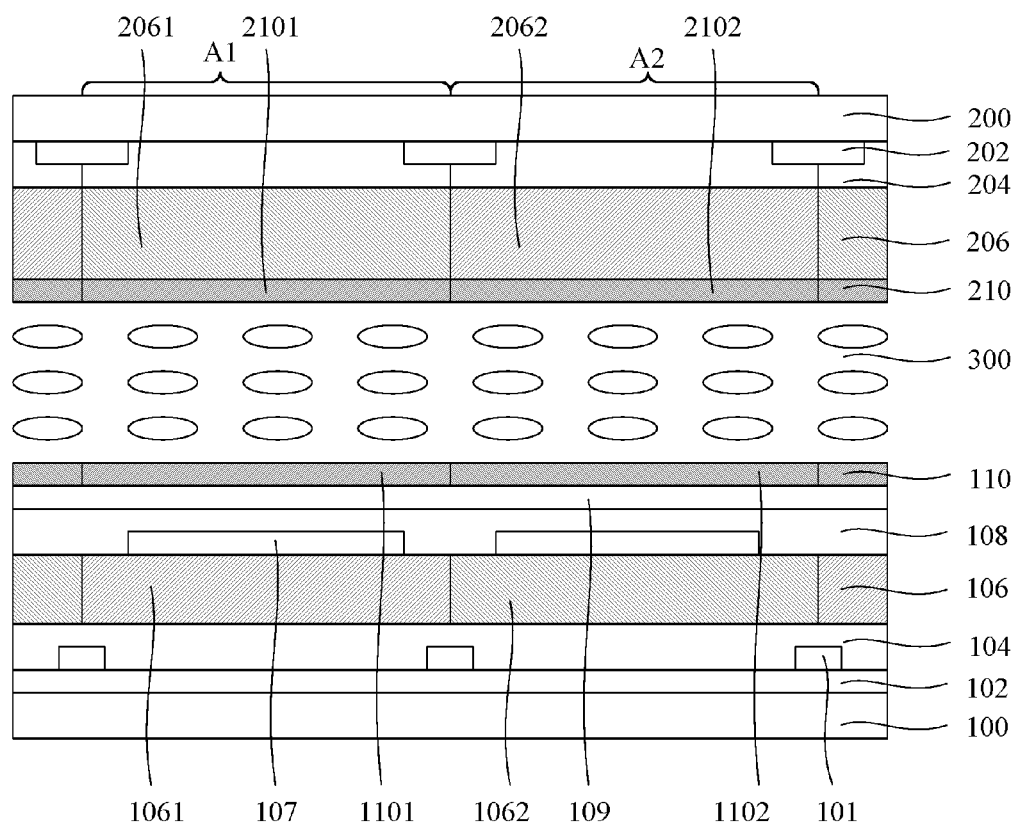
FIG. 1B illustrates a cross-sectional view along the AA' cross section in FIG. 1A.
Figure 1C:
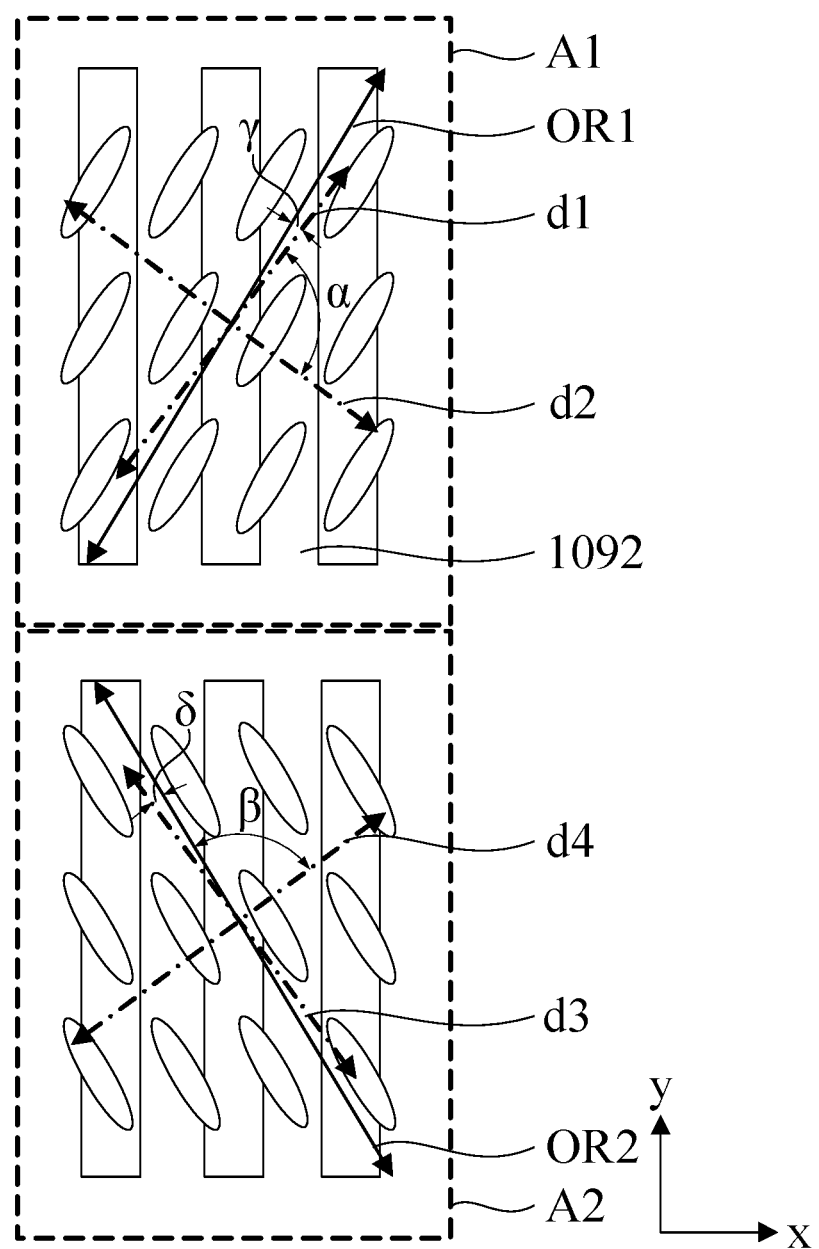
FIG. 1C illustrates a schematic diagram showing the orientation direction and the polarization axis direction in FIG. 1A.

FIG. 1A, FIG. 1B and FIG. 1C illustrate an exemplary liquid crystal display panel. FIG. 1A illustrates a top view of the exemplary liquid crystal display panel. FIG. 1B illustrates a cross-sectional view along the AA' cross section in FIG. 1A. FIG. 1C illustrates a schematic diagram showing the orientation direction and the polarization axis direction in FIG. 1A.

As shown in FIG. 1A and FIG. 1B, the liquid crystal display panel comprises a first transparent substrate 100 and a second transparent substrate 200 arranged opposite to the first transparent substrate 100. On the first transparent substrate 100, a plurality of scan lines 101 and a plurality of data lines 103 are disposed. The extending directions of the scan lines 101 and the data lines 103 are perpendicular to each other. For illustrative purposes, the extending direction of the scanning lines 101 is defined as a first direction x, and the extending direction of the data lines 103 is defined as a second direction y. Thus, the first direction x and the second direction y are perpendicular to each other. The plurality of scan lines 101 and the plurality of data lines 103 may intersect each other, defining a plurality of pixel regions and the pixel regions may be arranged in an array. FIG. 1A shows four pixel regions arranged as a 2×2 array.

Further, pixel electrodes 107 and common electrodes 109 may also be disposed on the first transparent substrate 100. The pixel electrodes 107 and the common electrodes 109 are located within individual pixel regions, and each common electrode 109 may include a first common electrode 1091 and a second common electrode 1092. A second common electrode 1092 is a stripe-shaped electrode located within a pixel region.

A switching element 105 is configured close to the intersection of a scan line 101 and a data line 103. Specifically, the switching element 105 comprises a semiconductor layer, a gate, a source and a drain. The gate is electrically connected to the corresponding scan line 101. The source is electrically connected to the corresponding data line 103. The drain is electrically connected to the corresponding pixel electrode 107.

In one embodiment, the pixel electrode 107 may be closer to the first transparent substrate 100 than the common electrode 109. In some other embodiments, the common electrode may be closer to the first transparent substrate than the pixel electrode and the pixel electrode may comprises a plurality of stripe-shaped electrodes; or the common electrode and the pixel electrode may be configured in a same layer, insulated from each other and both the common electrode and the pixel electrode may comprise a plurality of stripe-shaped electrodes.

More specifically, as shown in FIG. 1B, the first transparent substrate 100 further comprises a first insulating layer 102, a second insulating layer 104, a first organic film layer 106, a third insulating layer 108, and a first alignment layer 110.

The first insulating layer 102 comprises a gate insulating layer, and the first insulating layer 102 is located between the scan lines 101 and the semiconductor layer of the first transparent substrate 100. The second insulating layer 104 is an inner dielectric layer, and the second insulating layer 104 is located between the layer where the scan lines 101 are located and the layer where the data lines 103 are located. The first organic film layer 106 is located between the layer where the data lines 103 are located and the layer where the pixel electrodes 103 are located.

The first organic film layer 106 may include a polymer doped with dichroic organic dye, and the polymer is a polyimide. Thus, the first organic film layer 106 may have a flattening or planarization effect, and may reduce the level difference between the first organic film layer 106 and the first transparent substrate 100 caused by the layer patterns. The third insulation 108 is located between the pixel electrode 107 and the common electrode 109. The first alignment layer 110 is configured on the surface of the first transparent substrate 100 facing the second transparent substrate 200.

As shown in FIG. 1B, the second transparent substrate 200 includes a light shielding layer 202, a color filter layer 204, a second organic film layer 206, and a second alignment layer 210. The light-shielding layer 202 is generally a light-blocking black matrix for blocking the area corresponding to the non-display region of the first transparent substrate 100. The color filter layer 204 comprises a plurality of color filter films with different colors, corresponding to the different pixel region configurations of the first transparent substrate 100.

The second organic layer 206 comprises a polymer doped with a dichroic organic dye, and the polymer is a polyimide. The second organic film layer 206 may also have a flattening or planarization effect, and may reduce the level difference between the second organic film layer 206 and the second transparent substrate 200 caused by the layer patterns. The second alignment layer 210 is configured on the surface of the second transparent substrate 200 facing the first transparent substrate 100.

In certain above embodiments, the first organic layer and second organic layer are a polyimide doped with an organic a dichroic dye. However, the first organic film layer and the second organic film layer may be other polymers doped with an organic dichroic dye. For example, in some other embodiments, the polymer may be any one of the polymers such as azo group-containing polymers, poly-cinnamoyl derivatives, and polyimides. In the formation process, the pre-polymers of this type of polymers have photosensitive properties. When the photosensitive pre-polymers of this type of polymers are irradiated by polarized light, the resulting polymers may be aligned in a certain direction.

Further, the dichroic organic dye may be an azo dye, and the dichroic ratio of dichroic organic dye is larger than seven (7). The molecules of the dichroic organic dye have different light absorption rates in the directions of the long axis and the short axis, thus displaying different colors, and the ratio between the light absorption rate in the long axis direction and the light absorption rate in the short axis direction is larger than seven (7).

When forming the first organic film layer and the second organic film layer, because the polyimide base is aligned in a certain way, the azo dye in the polyimide base may be induced to be aligned in the way through which the polyimide base is arranged. Therefore, the first organic film layer and the second organic film layer have different light absorption rates and transmittance rate in different directions.

Because the organic film layers have different absorption rates in different directions, the light passes through an organic film layer becomes polarized. The polarization direction of the polarized light is the polarization axis of the organic film layer. Therefore, the first organic film layer and the second organic film layer have a polarization function, and can be used to replace the prior art polarizing plate and reduce the thickness of a polarizer. Further, because no triacetyl cellulose (TAC) protection layer and adhesive layer is needed, the reliability of the polarizer is improved and, as the polarization function can be achieved without stretching, the polarizer is not prone to warping phenomena.

Further, the azo dye is used as an example. In some other embodiments, other dichroic dyes with dichroic ratio larger than seven (7) may also be used. For example, the dichroic dye used may be any one or more of azo dye, anthraquinone dye, biphenyl dye, triphenylmethane dye, diazinon and derivative, single-methine dye, multi-methine dye, and polycyclic dye.

In certain above embodiments, the first organic film layer 106 is located between the first transparent substrate 100 and the first alignment layer 110, and also functions as a planarization layer. In some other embodiments, the first organic film layer may be located at the surface of the first transparent substrate opposite to the first alignment layer, and functions as a polarizing layer only.

Further, the second organic layer 206 is located between the second transparent substrate 200 and the second alignment layer 210, and also functions as a planarization layer. In some other embodiments, the second organic film layer may be located at the surface of the second transparent substrate opposite to the second alignment layer, and functions as a polarizing layer only.

As shown in FIG. 1B, the liquid crystal display panel further comprises a liquid crystal layer 300 sandwiched between the first transparent substrate 100 and the second transparent substrate 200. Specifically, the liquid crystal layer 300 is located between the first alignment layer 110 and the second alignment layer 210. In one embodiment, the liquid crystal molecules in the liquid crystal layer 300 are liquid crystal molecules with positive dielectric anisotropy.

As shown in FIG. 1A, FIG. 1B and FIG. 1C, the liquid crystal display panel includes multiple sub-regions arranged in an array. The row direction of the array extends along the first direction x, and the column direction of the array extends in the second direction y. The multiple sub-regions comprise a first sub-region A1 and an adjacent second sub-region A2. The first sub-region A1 and the adjacent second sub-region A2 are located in two adjacent pixel regions.

As shown in FIG. 1A, in the four pixel region arranged in a 2×2 array, the first sub-region A1 and the second sub-region A2 are adjacently arranged in the second direction y, and are located within two adjacent pixel regions along the second direction y respectively. Thus, if the first sub-region A1 is located on the $m^{th}$ row and the $n^{th}$ column, the second sub-region A2 is located in the $(m+1)^{th}$ row and the $n^{th}$ column, where m and n are positive integers. Further, the extending direction of the stripe-shaped electrodes 1092 in the first sub-regions A1 and the second sub-region A2 is along a column direction of the array. That is, the extending direction of the stripe-shaped electrodes 1092 in the first sub-region A1 and the second sub-region A2 is along the second direction y.

In a liquid crystal display panel with such configuration, the stripe-shaped electrodes 1092 in the first sub-region A1 and the second sub-region A2 extend along a same direction. When the first transparent substrate 100 and second transparent substrate 200 are aligned and bonded, because the structures of the first sub-region A1 and the second sub-region A2 are consistent, the effect of the possible misalignment to the aperture rate of the first sub-region A1 and the second sub-region A2 is relatively low, and thus increasing the aperture rate of the liquid crystal display panel.

In some other embodiments, the stripe-shaped electrodes in the first sub-region and the second sub-region may be symmetrical with respect to the row direction or the column direction of the array. In a liquid crystal display panel with a symmetrical design, electric fields in different directions can be generated, improving the viewing angle of the liquid crystal display panel.

As shown in FIG. 1B and FIG. 1C, in the liquid crystal display panel, the portion 1061 of the first organic film layer 106 at the first sub-region A1 has a first polarization axis d1, and the portion 2061 of the second organic film 206 in the first sub-region A1 has a second polarization axis d2. The first polarization axis d1 and the second polarization axis d2 are substantially vertical to each other. That is, the angle between the first polarization axis d1 and the second polarization axis d2 is $\alpha$, and $\alpha=90°$. The portion 1062 of the first organic film layer 106 at the second sub-region A2 has a third polarization axis d3, and the portion 2062 of the second organic film 206 at the second sub-region A2 has a fourth polarization axis d4. The third polarization axis d3 and the fourth polarization axis d4 are substantially vertical to each other. That is, the angle between the third polarization axis d3 and the fourth polarization axis d4 is $\beta$, and $\beta=90°$.

Further, the section 1101 of the first alignment layer 110 in the first sub-region A1 and the portion 2101 of the second alignment layer 201 in the first sub-region A1 have a first alignment or orientation direction OR1. The first orientation direction OR1 is substantially parallel to the first polarization axis d1. That is, the angle between the first orientation direction OR1 and the first polarization axis d1 is γ, and γ=0°. The portion 1102 of the first alignment layer 110 in the second sub-region A2 and the portion 2102 of the second alignment layer 201 in the second sub-region A2 have a second orientation direction OR2. The second orientation direction OR2 is substantially parallel to the second polarization axis d2. That is, the angle between the second orientation direction OR2 and the second polarization axis d2 is δ, and δ=0°.

In a liquid crystal display panel with such configuration, the first sub-region A1 and the second sub-region A2 have different orientation directions and different polarization axes. Therefore, when viewed at different viewing angles, the images seen by the viewer are the effects of mutual-compensation of the two sub-regions. Thus, the viewing angle compensation can be achieved in different directions, and is not limited to the electrode shapes. Therefore, the viewing angle range of the liquid crystal display panel is improved.

In some other embodiments, it is possible to make $89°\leq\alpha\leq91°$, $89°\leq\beta\leq91°$, $-1°\leq\gamma\leq1°$, $-1°\leq\delta\leq1°$. When angles within these angle ranges are used, the first polarization axis d1 and the second polarization axis d2 are substantially vertical to each other; the first orientation direction OR1 and the first polarization axis d1 are substantially parallel; the third polarization axis d3 and the fourth polarization axis d4 are substantially vertical to each other; and the second orientation direction OR2 and the third polarization axis d3 are substantially parallel. In such configuration, there are no dark-state light leakage phenomena.

In certain above embodiments, the first orientation direction OR1 is substantially parallel to the first polarization axis d1. In some other embodiments, the first orientation direction OR1 may also be substantially parallel to the second polarization axis d2. That is, the angle between the first orientation direction OR1 and the first polarization axis d1 or the second polarization axis d2 is γ, and $-1°\leq\gamma\leq1°$.

In certain above embodiments, the second orientation direction OR2 is substantially parallel to the third polarization axis d3. In some other embodiments, the second orientation direction OR2 may also be substantially parallel to the fourth polarization axis d4. That is, the angle between the second orientation direction OR2 and the third polarization axis d3 or the fourth polarization axis d4 is δ, where $-1°\leq\delta\leq1°$.

As shown in FIG. 1C, the first orientation direction OR1 and the second orientation direction OR2 are symmetrical with respect to the row direction of the array. That is, the first orientation direction OR1 and the second orientation direction OR2 are symmetrical with respect the first direction x. The liquid crystal display panel may have a symmetrical viewing angle, and a better display effect.

In some other embodiments, the first orientation direction OR1 and the second orientation direction OR2 may be asymmetrical with respect to a first direction x. When using an asymmetric structure, stripe-shaped electrodes may be asymmetrically arranged with respect to the first direction x, such that in the first sub-region A1 and the second sub-region A2, the angle between the first orientation direction OR1 and the stripe-shaped electrodes and the angle between the second orientation direction OR2 and the stripe-shaped electrodes are equal. In such configuration, under a same driving voltage, the liquid crystal molecules in the first sub-region A1 and the second sub-region A2 have a same rotation angle, and the display unevenness does not appear in the liquid crystal display panel. In a liquid crystal display panel with an asymmetric design, the viewing angle compensation can be achieved in different directions, so as to meet different viewing angle requirements.

It should be noted that, positive liquid crystal molecules are as an example. When positive liquid crystal molecules are used, the angle between the extending directions of the first orientation direction OR1 and the stripe-shaped electrodes, and the angle between the extending directions of the second orientation direction OR2 and the stripe-shaped electrodes are less than 45°. The reason for this is that, when a driving voltage is applied to a pixel electrode and a common electrode respectively, an electric field that is substantially vertical to the extending direction of the stripe electrodes is formed. The positive liquid crystal molecules may correspondingly rotate to a direction parallel to the direction the electric field. During the rotation process, when the angle between the orientation direction and the extending direction of the stripe-shaped electrodes is less than 45°, the liquid crystal molecules may achieve a brightest state, and a high contrast is thus obtained.

In some other embodiments, when liquid crystal molecules with a negative dielectric anisotropy are used, it is needed to make the angle between the first orientation direction and the extending direction of the stripe-shaped electrodes, and the angle between the second orientation direction and the extending direction of the stripe-shaped electrodes larger than 45°. In such configuration, during the rotation process of the negative liquid crystal molecules driven by an electric field, a brightest state can be achieved, and a high contrast can be obtained.

Accordingly, the organic film layers and the alignment layers at the first sub-region and the second sub-region have different orientation directions and polarization axes. Viewing angle compensation can be achieved in different directions, and is not limited by the electrode shapes, and the transmittance of the liquid crystal display panel is thus improved. Further, because the organic film layers have polarized transmission characteristics, no additional polarizing plate needs to be attached, and thus the thickness of the display device is decreased.

Figure 2A:
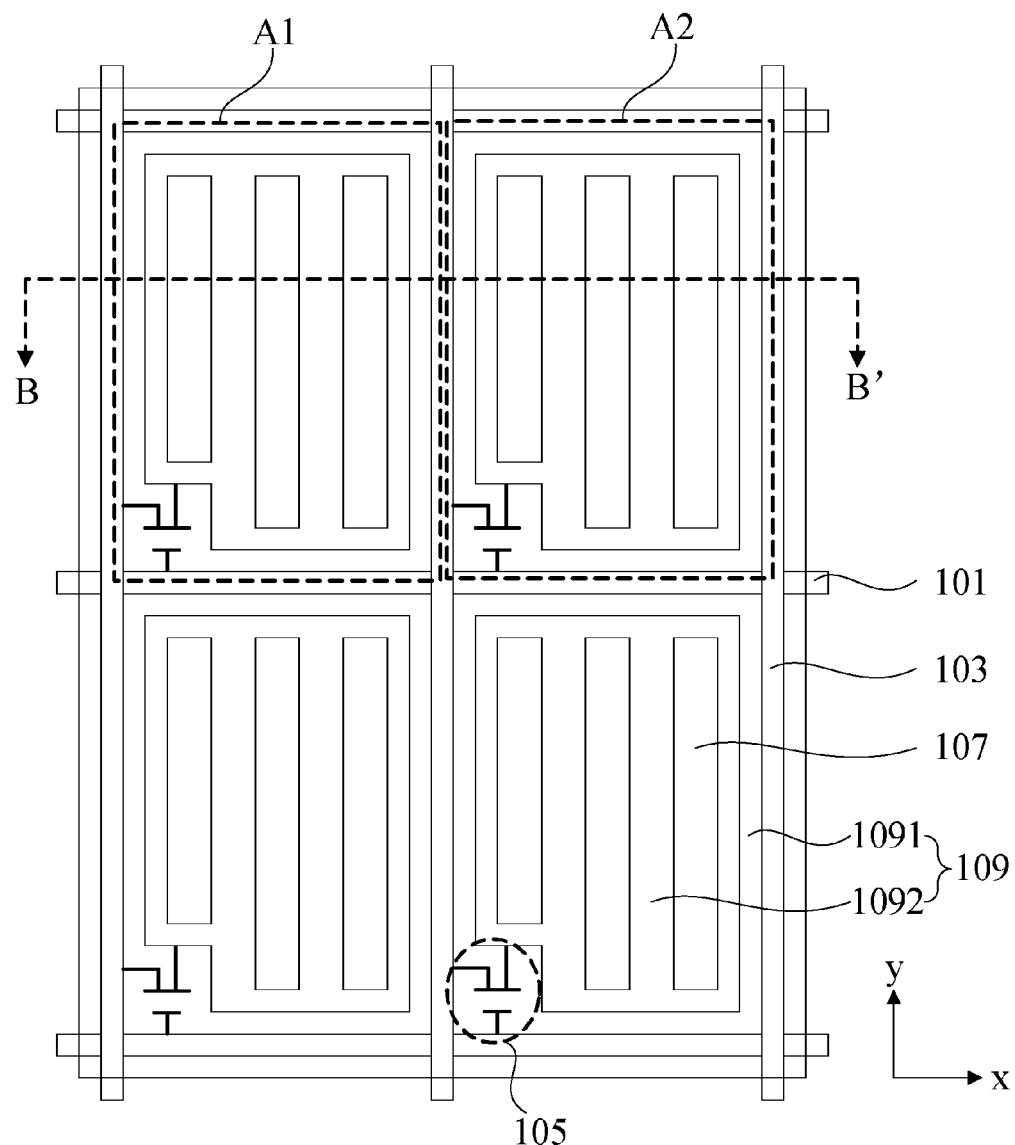
FIG. 2A illustrates a top view of another exemplary liquid crystal display panel consistent with the disclosed embodiments.
Figure 2B:
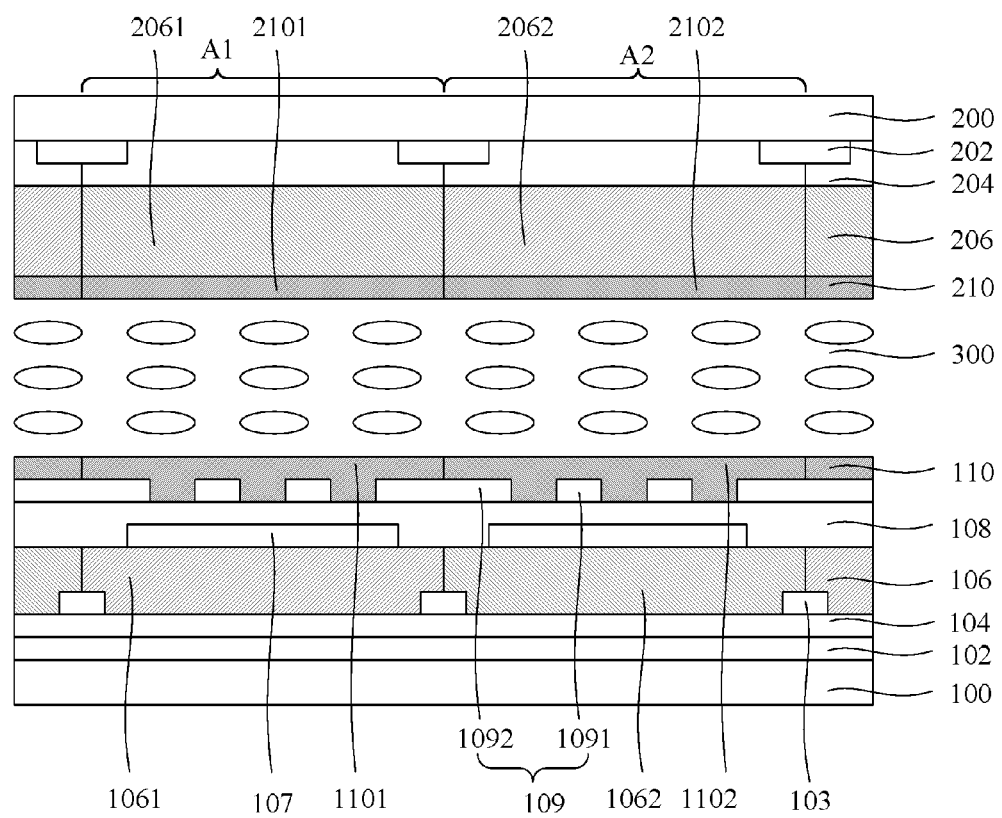
FIG. 2B illustrates a cross-sectional view along the BB' cross section in FIG. 2A.
Figure 2C:
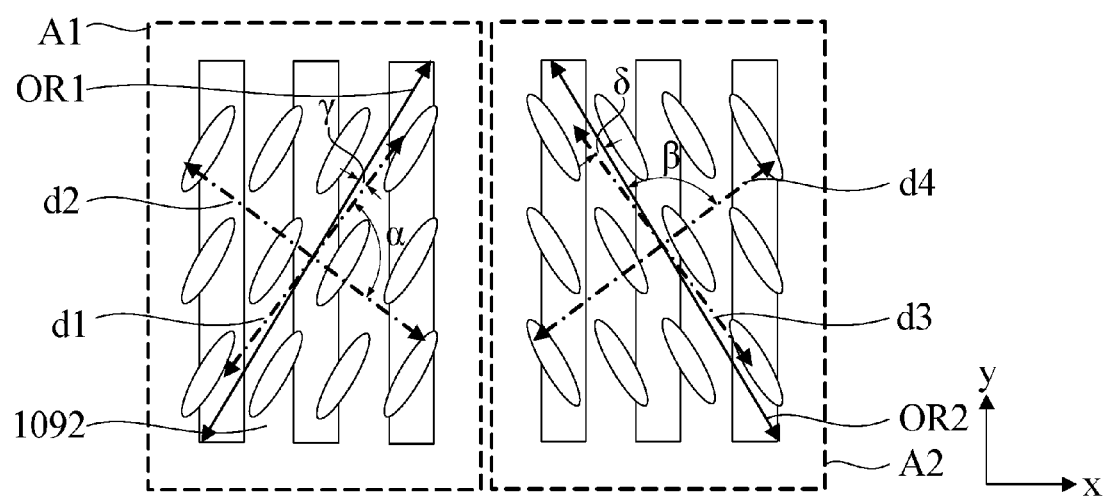
FIG. 2C illustrates a schematic diagram showing the orientation direction and the polarization axis direction in FIG. 2A.

FIG. 2A, FIG. 2B and FIG. 2C illustrate another exemplary liquid crystal display panel. FIG. 2A illustrates a top view of the liquid crystal display panel. FIG. 2B illustrates a cross-sectional view along the BB' cross section in FIG. 2A. FIG. 2C illustrates a schematic diagram showing the orientation direction and the polarization axis direction in FIG. 2A. The structure of the liquid crystal display panel is similar to the structure of that shown in FIG. 1A, FIG. 1B and FIG. 1C. In the following, the parts that are different from the structure shown in FIG. 1A, FIG. 1B and FIG. 1C may be described in detail.

As shown in FIG. 2A and FIG. 2B, the liquid crystal display panel includes a plurality of scan lines 101 and a plurality of data lines 103 configured on the first transparent substrate 100. The extending directions of the scan lines 101 and the data lines 103 are perpendicular to each other. In one embodiment, the extending direction of the scan lines 101 is defined as a first direction x, and the extending direction of the data lines 103 is defined as a second direction y, wherein the first direction x and the second direction y are perpendicular to each other. The plurality of scan lines 101 and the plurality of data lines 103 intersect each other, defining a plurality of pixel regions arranged in an array. FIG. 2A shows four pixel regions arranged in a 2×2 array.

Pixel electrodes 107 and common electrodes 109 are also configured on the first transparent substrate 100. The pixel electrodes 107 are located within a pixel region. The common electrodes 109 include a first common electrode 1091 and a second common electrode 1092. The second common electrode 1092 is a stripe-shaped electrode located within a pixel region. A switching element 105 is configured close to the intersection of a scan line 101 and a data line 103.

As shown in FIG. 2B, various layers may be formed on the transparent substrate 100, including a first insulating layer 102, a second insulating layer 104, a first organic film layer 106, a third insulating layer 108 and a first alignment layer 110. The first organic film layer 106 may include a polymer doped with a dichroic organic dye, and the polymer may be polyimide. Further, the first organic film layer 106 has a flattening effect, and may reduce the level difference between the first organic film layer 106 and the first transparent substrate 100 caused by the layer patterns.

Various layers may also be formed on the second transparent substrate 200, including a light-shielding layer 202, a color filter layer 204, a second organic film layer 206 and a second alignment layer 210. The second organic film layer 206 has a flattening effect, and may reduce the level difference between the second organic film layer 206 and the second transparent substrate 200 caused by the layer patterns.

As shown in FIG. 2A, FIG. 2B, and FIG. 2C, the liquid crystal display panel comprises a multiple sub-regions arranged in an array. The row direction of the array extends along the first direction x, and the column direction of the array extends along the second direction y. The multiple sub-regions comprise a first sub-region A1 and an adjacent second sub-region A2, and the first sub-region A1 and the second sub-region A2 are located in two adjacent pixel regions. As shown in FIG. 2A, in the four pixel regions arranged in a 2×2 array, the first sub-region A1 and the second sub-region A2 are adjacently arranged along the first direction x, and are located within two adjacent pixel regions along the first direction x. That is, if the first sub-region A1 is located on the $m^{th}$ row and the $n^{th}$ column, the second sub-region A2 is located on the $m^{th}$ row and the $(n+1)^{th}$ column, where m and n are positive integers. Further, the extending direction of the stripe-shaped electrodes 1092 in the first sub-region A1 and the second sub-region A2 is along the column direction of the array. That is, the stripe-shaped electrodes 1092 in the first sub-region A1 and the second sub-region A2 extend in the second direction y.

As shown in FIG. 2B and FIG. 2C, in the liquid crystal display panel, the portion 1061 of the first organic film layer 106 at the first sub-region A1 has a first polarization axis d1, and the portion 2061 of the second organic film layer 206 in the first of the sub-region A1 has a second polarization axis d2. The first polarization axis d1 and the second polarization axis d2 are substantially vertical to each other. That is, the angle between the first polarization axis d1 and second polarization axis d2 is α, and α=90°. The portion 1062 of the first organic film layer 106 at the second sub-region A2 has a third polarization axis d3, and the portion 2062 of the second organic film layer 206 in the second sub-region A2 has a fourth polarization axis d4. The third polarization axis d3 and the fourth polarization axis d4 are substantially vertical to each other. That is, the angle between the third polarization axis d3 and the fourth d4 polarization axis is β, and β=90°.

Further, the portion 1101 of the first alignment layer 110 in the first sub-region A1 and the portion 2101 of the second alignment layer 210 at the first sub-region A1 have a first orientation direction OR1. The first orientation direction OR1 and the first polarization axis d1 are substantially parallel, i.e., the angle between the first orientation direction OR1 and the first polarization axis d1 is γ, and γ=0°. The portion 1102 of the first alignment layer 110 in the second sub-region A2 and the portion 2102 of the second alignment layer 210 in the second sub-region A2 have a second orientation direction OR2. The second orientation direction OR2 and the third polarization axis d3 are substantially parallel, i.e., the angle between the second orientation direction OR2 and the third polarization axis d3 is δ, and δ=0°.

In a liquid crystal display panel with the present structure, because the first sub-region A1 and the second sub-region A2 have different orientation directions and different polarization axes, the images seen from different viewing directions are the effects after the compensation of the two sub-regions. Viewing angle compensation of these images can be achieved at different directions, and is not restricted by the electrode shapes, and the viewing angle of the liquid crystal display panel is thus improved.

As shown in FIG. 2C, in the liquid crystal display panel, the first orientation direction OR1 and the second orientation direction OR2 are symmetric with respect to the column direction of the array. That is, the first orientation direction OR1 and the second orientation direction OR2 are symmetric with respect to the second direction y. Further, in the first sub-region and a second sub-region, the extending directions of the stripe-shaped electrodes are symmetrical with respect to the second direction y. A liquid crystal display panel with this structure has a symmetrical viewing angle, and thus a better display effect.

In some other embodiments, the first orientation direction OR1 and the second orientation direction OR2 may be asymmetrical with respect to the second direction y. When an asymmetrical structure is used, stripe-shaped electrodes may be asymmetrically arranged with respect to the second direction y, such that, in the first sub-region A1 and the second sub-region A2, the angle between the first orientation direction OR1 and the stripe-shaped electrodes and the angle between the second orientation direction OR2 and stripe-shaped electrodes are equal. Therefore, under a same driving voltage, the liquid crystal molecules in the first sub-region A1 and the second sub-region A2 have a same rotation angle, and so the display unevenness does not appear in the liquid crystal display panel. Thus, the viewing angle compensation can be achieved from different angles, so as to meet different viewing angle requirements.

Accordingly, the organic film layers and the alignment layers have different orientation directions and different polarization axes at the first sub-region and the second sub-region, respectively. Viewing angle compensation can be achieved in different directions, and is not limited by the electrode shapes, and the transmittance of the liquid crystal display panel is thus improved. Further, because the organic film layers have the polarized transmission characteristics, no additional polarizing plates need to be attached, and thus the thickness of the display device is decreased.

Figure 3A:
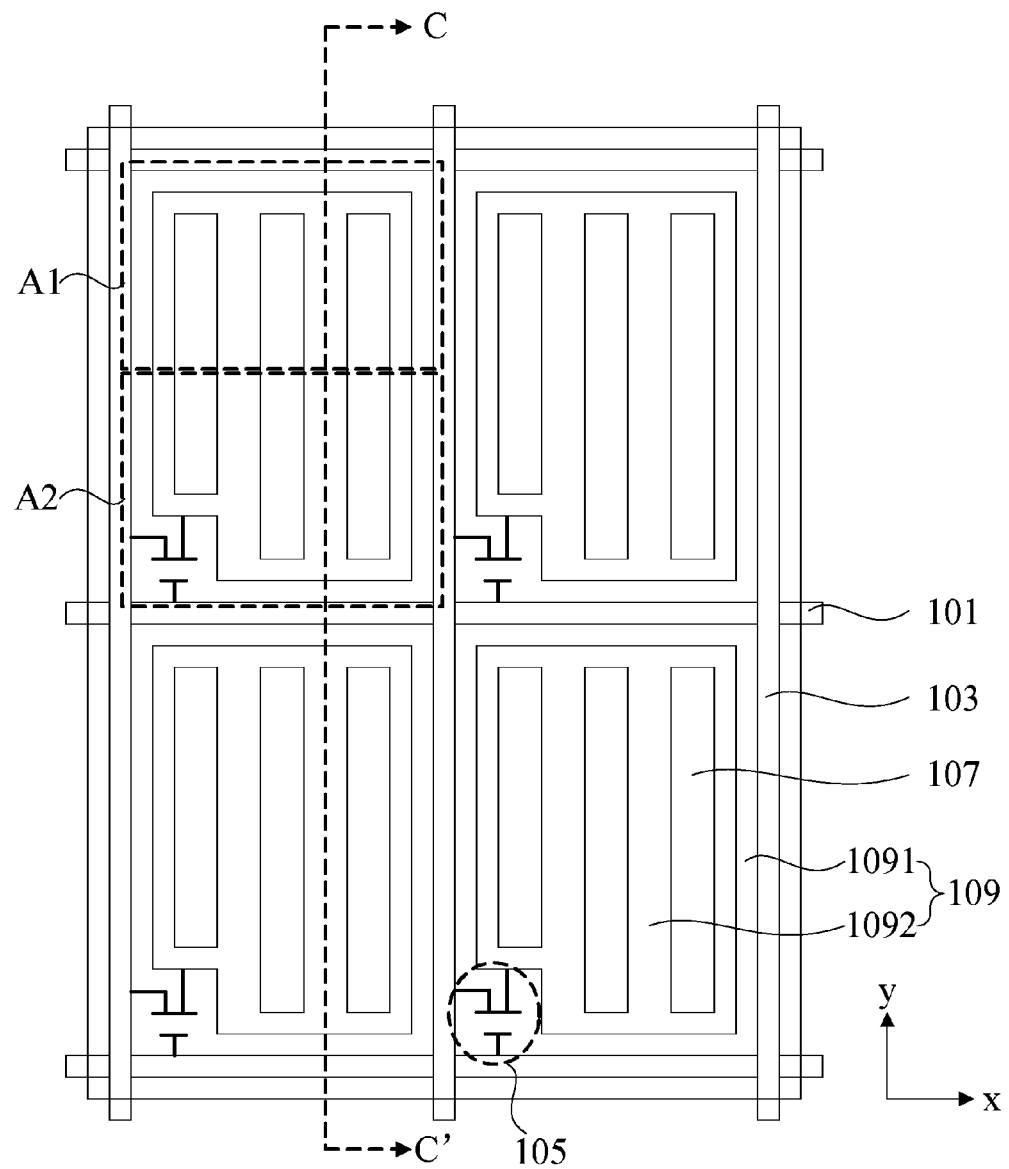
FIG. 3A illustrates a top view of another exemplary liquid crystal display panel consistent with the disclosed embodiments.
Figure 3B:
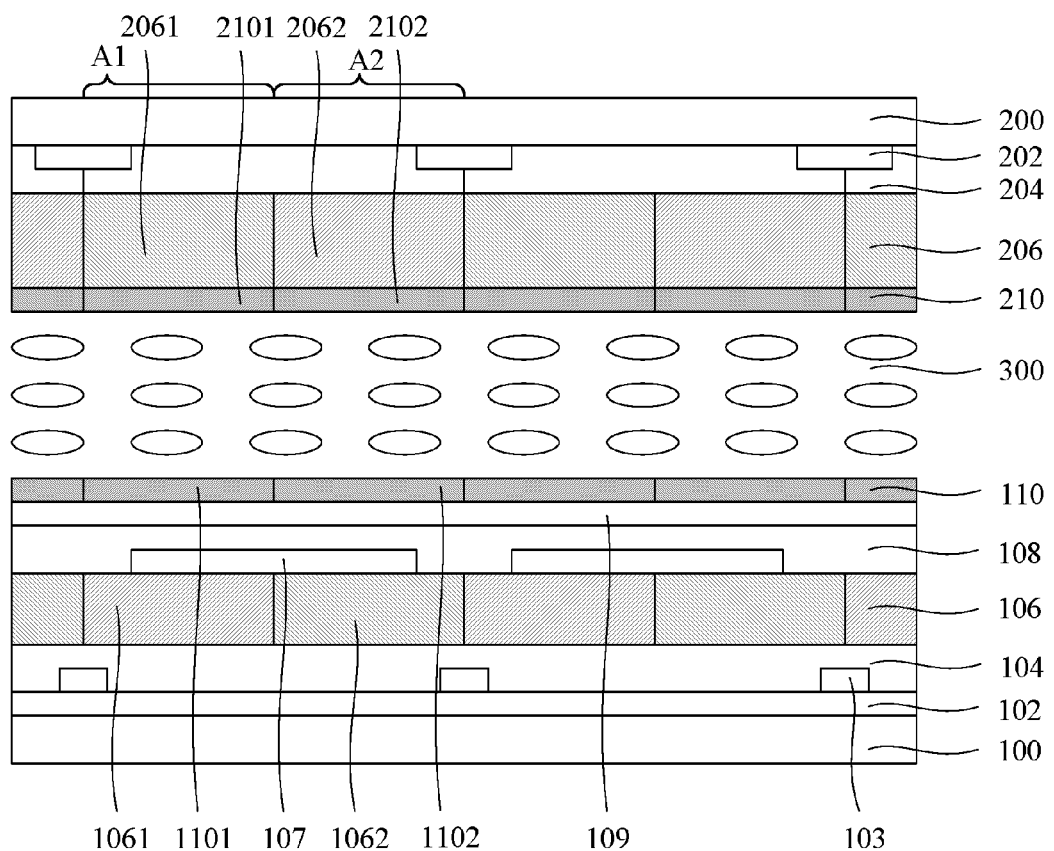
FIG. 3B illustrates a cross-sectional view along the CC' cross section in FIG. 3A.
Figure 3C:
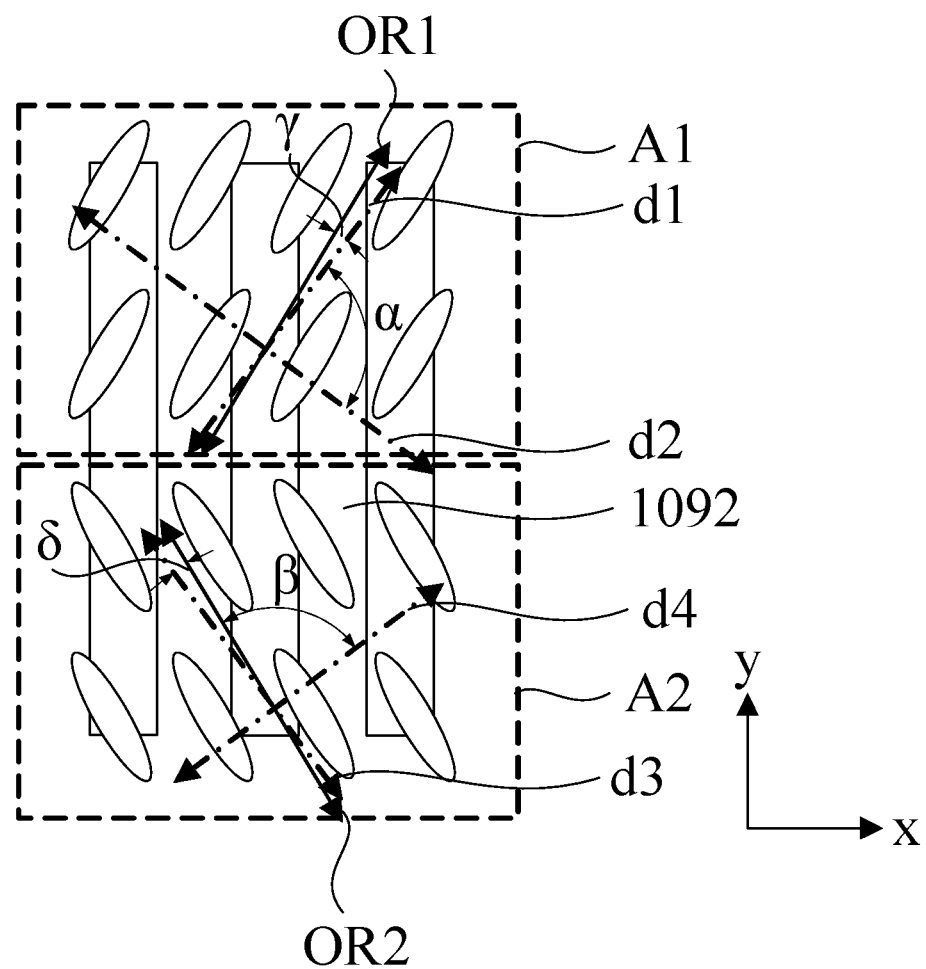
FIG. 3C illustrates a schematic diagram showing the orientation direction and the polarization axis direction in FIG. 3A.

FIG. 3A, FIG. 3B and FIG. 3C illustrate another exemplary liquid crystal display panel. FIG. 3A illustrates a top view of the liquid crystal display panel. FIG. 3B illustrates a cross-sectional view along the CC' cross section in FIG. 3A. FIG. 3C illustrates a schematic diagram showing the orientation direction and the polarization axis direction in FIG. 3A. The structure of the liquid crystal display panel may be similar to the structure shown in FIG. 1A, FIG. 1B and FIG. 1C. In the following, certain differences from the structure shown in FIG. 1A, FIG. 1B and FIG. 1C may be further described in detail.

As shown in FIG. 3A and FIG. 3B, the liquid crystal display panel includes a plurality of scan lines 101 and a plurality of data lines 103 configured on the first transparent substrate 100. The extending directions of the scan lines 101 and the data lines 103 are perpendicular to each other. The extending direction of the scan lines 101 is defined as a first direction x, the extending direction of the data lines 103 is defined as a second direction y, and the first direction x and the second direction y are perpendicular to each other.

The plurality of scan lines 101 and the plurality of data lines 103 intersect each other, defining a plurality of pixel regions. FIG. 3A shows four pixel regions arranged in a 2×2 array. Pixel electrodes 107 and common electrodes 109 are also configured on the first transparent substrate 100. The pixel electrodes 107 are located within a pixel region. The common electrodes 109 include a first common electrode 1091 and a second common electrode 1092. The second common electrode 1092 is a stripe-shaped electrode located within a pixel region. A switching element 105 is configured close to the intersection of a scan line 101 and a data line 103.

As shown in FIG. 3B, various layers may be formed on the first transparent substrate 100, including a first insulating layer 102, a second insulating layer 104, a first organic film layer 106, a third insulating layer 108 and a first alignment layer 110. The first organic film layer 106 may include a polymer doped with a dichroic organic dye, and the polymer may be polyimide. Further, the first organic film layer 106 has a flattening effect, and may reduce the level difference between the first organic film layer 106 and the first transparent substrate 100 caused by the layer patterns.

Various layers may also be formed on the second transparent substrate 200, including a light-shielding layer 202, a color filter layer 204, a second organic film layer 206 and a second alignment layer 210. The second organic film layer 206 has a flattening effect, and may reduce the level difference between the second organic film layer 206 and the second transparent substrate 200 caused by the layer patterns.

As shown in FIG. 3A, FIG. 3B and FIG. 3C, the liquid crystal display panel comprises a multiple sub-regions arranged in an array. The row direction of the array extends along the first direction x, and the column direction of the array extends along the second direction y. The multiple sub-regions comprises a first sub-region A1 and second sub-region A2 that are adjacent, and the adjacent first sub-region A1 and the second sub-region A2 are located in a same pixel region. As shown in FIG. 3A, in the four pixel regions arranged in a 2×2 array, the first sub-region A1 and the second sub-region A2 are adjacently arranged along the second direction y, and are located within a same pixel region.

Further, the first sub-region A1 and the second sub-region A2 may be arranged adjacent along the second direction y, and the first sub-region A1 and the second sub-region A2 are located in a same pixel region. In some other embodiments, a first sub-region and a second sub-region may be adjacent along the first direction x, and located in a same pixel region. Further, the numbers of first sub-regions and second sub-regions in a pixel region are not limited. A pixel region may comprise a first sub-region and a second sub-region, and may also comprise multiple sets of adjacent first sub-region and second sub-region.

As shown in FIG. 3B and FIG. 3C, in the liquid crystal display panel, the portion 1061 of the first organic film layer 106 at the first sub-region A1 has a first polarization axis d1, and the portion 2061 of the second organic film layer 206 in the first sub-region A1 has a second polarization axis d2. The first polarization axis d1 and the second polarization axis d2 are substantially vertical to each other. That is, the angle between the first polarization axis d1 and second polarization axis d2 is α, and α=90°. The portion 1062 of the first organic film layer 106 at the second sub-region A2 has a third polarization axis d3, and the portion 2062 of the second organic film layer 206 in the second sub-region A2 has a fourth polarization axis d4. The third polarization axis d3 and the fourth polarization axis d4 are substantially vertical to each other. That is, the angle between the third polarization axis d3 and the fourth d4 polarization axis is β, and β=90°.

Further, the portion 1101 of the first alignment layer 110 in the first sub-region A1 and the portion 2101 of the second alignment layer 210 in the first sub-region A1 have a first orientation direction OR1. The first orientation direction OR1 and the first polarization axis d1 are substantially parallel, i.e., the angle between the first orientation direction OR1 and the first polarization axis d1 is γ, and γ=0°. The portion 1102 of the first alignment layer 110 in the second sub-region A2 and the portion 2102 of the second alignment layer 210 in the second sub-region A2 have a second orientation direction OR2. The second orientation direction OR2 is substantially parallel to the third polarization axis d3, i.e., the angle between the second orientation direction OR2 and the third polarization axis is δ, and δ=0°.

In a liquid crystal display panel with the present structure, because the first sub-region A1 and the second sub-region A2 have different orientation directions and different polarization axes, the images seen from different viewing directions are the effects after the compensation of the two regions. The viewing angle compensation of these images can be achieved at different directions, and is not restricted by the electrode shapes, and the viewing angle of the liquid crystal display panel is thus improved.

Accordingly, the organic film layers and the alignment layers have different orientation directions and different polarization axes at the first sub-region and the second sub-region, respectively. Viewing angle compensation can be achieved in different directions, and is not limited by the electrode shapes, and the transmittance of the liquid crystal display panel is thus improved. Further, because the organic film layers have polarized transmission characteristics, no additional polarizing plate needs to be attached, and thus the thickness of the display device is decreased.

Figure 4:
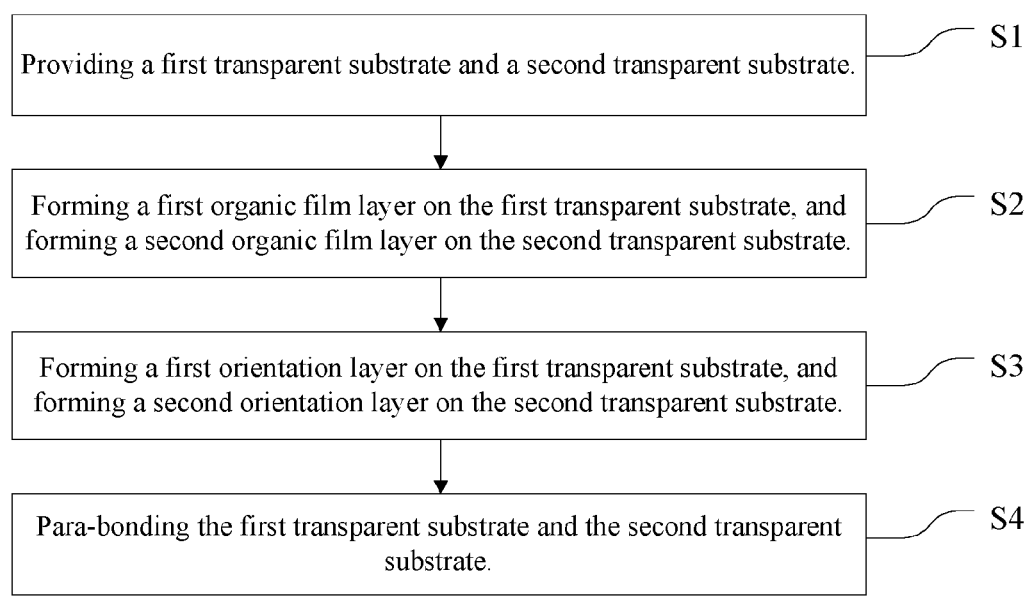
FIG. 4 illustrates a flow chart of an exemplary method for manufacturing a liquid crystal display panel consistent with the disclosed embodiments.

FIG. 4 illustrates a flow chart of an exemplary fabrication process of a liquid crystal display panel. FIGS. 5A-5J illustrate the cross-sectional views showing the exemplary liquid crystal display panel during certain manufacturing stages. The fabrication process may include following steps.

Figure 5A:
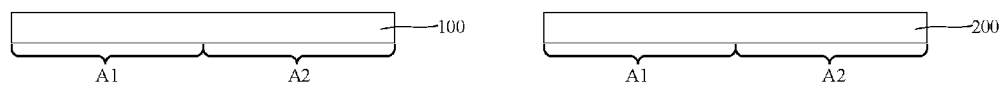
FIGS. 5A-5J illustrate the cross-sectional views showing the exemplary method for manufacturing a liquid crystal display panel as illustrated in FIG. 4.

Step S1: providing a first transparent substrate 100 and a second transparent substrate 200. FIG. 5A illustrates the corresponding structure. Specifically, the first transparent substrate 100 and the second transparent substrate 200 have a multiple sub-regions arranged as an array. The row direction of the array extends in the first direction x, and the column direction of the array extends in a second direction y. The multiple sub-regions include the adjacent first sub-region A1 and second sub-region A2. The first sub-region A1 and the second sub-region A2 on the first transparent substrate 100 correspond to the first sub-region A1 and the second sub-region A2 on the second transparent substrate 200, respectively.

Step S2: forming a first organic film layer on the first transparent substrate, and forming a second organic film layer on the second transparent substrate. FIG. 5B to FIG. 5e illustrate the corresponding structures.

Figure 5B:
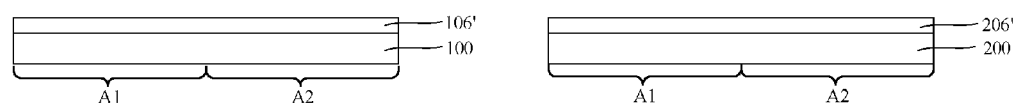

As shown in FIG. 5B, a first organic material layer 106' is formed on the first transparent substrate 100. The first organic material layer 106' comprises a polyimide prepolymer doped with a dichroic organic dye. A second organic material layer 206' is formed on the second transparent substrate 200. The second organic material layer 206' comprises a polyimide prepolymer doped with a dichroic organic dye. Further, the dichroic organic dye in the first organic material layer 106' and the second organic material layer 206' is a polyimide prepolymer of an azo group. The dichroic ratio of the azo group is larger than seven (7). The molecules of this material have different optical absorption rates at the long axis direction and the short axis direction, and thus display different colors. Further, the ratio of the light absorption rates at the major axis and the minor axis directions is larger than seven (7).

Figure 5C:
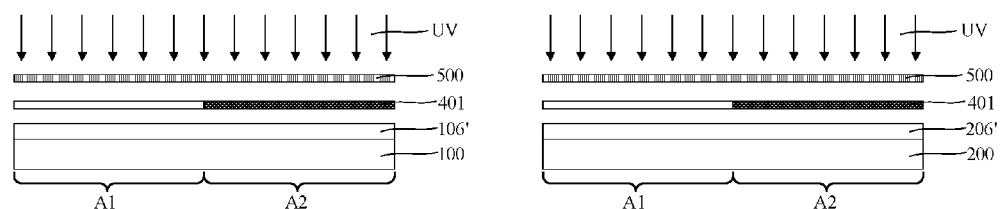
Figure 5D:
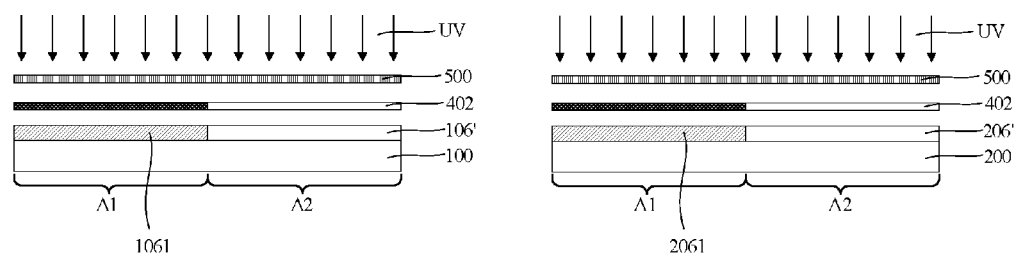

As shown in FIG. 5C and FIG. 5D, the first organic material layer 106' and the second organic material layer 206' are irradiated by polarized ultraviolet light. Specifically, as shown in FIG. 5C, a grating 500 and a first mask 401 are placed between the ultraviolet (UV) light source and the first organic material layer 106', and also a grating 500 and a first mask 401 are placed between the UV light source and the second organic material layer 206'. The UV light passes through the grating 500 and the first mask 401, and irradiates the first organic material layer 106' and the second organic material layer 206', respectively.

The grating 500 may be a metal grating, and has a plurality of slits in a certain direction. After transmitting through the slits on the grating 500, the ultraviolet light becomes polarized ultraviolet light with polarization direction along the slit direction of the grating 500. The first mask 401 has a first light shielding region and a first light-transmitting region. The first light-transmitting region of the first mask 401 corresponds to the first sub-region A1 on the first transparent substrate 100.

After transmitting through the first mask 401, the polarized ultraviolet light irradiates the first organic material layer 106' at the first sub-region A1 on the first transparent substrate 100. Because the polyimide prepolymer has photosensitivity, under polarized ultraviolet irradiation, the molecular chains of the polyimide prepolymer that are parallel to the polarization direction of the polarized UV light break, while the molecular chains of the polyimide prepolymer that are perpendicular to the polarization direction of the polarized UV light are not affected.

Thus, the formed polyimide has long molecular chains perpendicular to the polarization direction of the polarization UV light. Eventually, a polyimide base arranged in a certain direction is formed, inducing the azo dye to arrange according to the arrangement format of the polyimide base. Because the azo dye has dichroism, the portion 1061 of the first organic film layer in the first sub-region A1 has different light absorption rates and light transmission rates in different directions. That is, the portion 1061 of the first organic film layer in the first sub-region A1 has polarization characteristics.

Similarly, the first sub-region A1 on the second transparent substrate 200 corresponds to the first sub-region A1 on the first transparent substrate 100. Using the same grating 500 and the same first mask 401, the second organic material layer 206' in the first sub-region A1 of the second transparent substrate 200 is irradiated, and the obtained portion 2061 at the first sub-region A1 of the second organic film layer has polarization characteristics.

After the first sub-region A1 on the first transparent substrate 100 and the first sub-region A1 on the second transparent substrate 200 are irradiated, the second sub-region A2 on the first transparent substrate 100 and the second sub-region A2 on the second transparent substrate 200 are irradiated. As a result, the portion 1062 at the second sub-region A2 of the first organic film layer 100 and the portion 2062 at the second sub-section area A2 of the second organic film layer have polarization characteristics.

The irradiation process for the second sub-region A2 is illustrated in FIG. 5D. As shown in FIG. 5D, a grating 500 and a second mask 402 are placed between the ultraviolet (UV) light source and the first organic material layer 106', and also a grating 500 and a second mask 402 are placed between the UV light source and the second organic material layer 206'. The second mask 402 has a second light-transmission region and a second light blocking region. The second light-transmission region of the second mask 402 corresponds to the second sub-region A2 on the first transparent substrate 100 and the second sub-region A2 on the second transparent substrate 200. The UV light successively passes through the grating 500 and the second mask 402, and irradiates the first organic material layer 106' and the second organic material layer 206'.

It should be noted that, because the same grating 500 is used during the irradiation on the first sub-region A1 and the second sub-region A2, the polarized ultraviolet light passing through the grating 500 has the same polarization direction. Therefore, when different polarization directions at the portions of the organic film layers at the first sub-region A1 and the second sub-region A2 are required, the first transparent substrate 100 or the second transparent substrate 200 need to be rotated. In this way, when the first sub-region A1 and the second sub-region A2 are irradiated, the first transparent substrate 100 and the second transparent substrate 200 have different angles with the polarization direction of the polarized ultraviolet light.

In one embodiment, the first sub-region is irradiated first, and then the second sub-region is irradiated. In an actual implementation process, the second sub-region may be irradiated first, and then the second sub-region is irradiated.

Further, before the first organic material layer 106' is formed, the fabrication process may further include forming scan lines, data lines, a semiconductor layer and a multilayer insulating layer on the first transparent substrate 100 and, before the second organic material layer 206' is formed, forming a black matrix, a color resist layer or other films on the second transparent substrate 200.

In certain embodiments, the UV light successively passes through the grating and the mask, and irradiates the organic material layer. In some other embodiments, a regionalized grating may be used. The regionalized grating has different regions, and the different regions have slits with different directions. After passing through the regionalized grating, the ultraviolet light becomes a regionally polarized ultraviolet light. The regionally polarized ultraviolet light may have different polarization directions corresponding to the different regions of the grating. When the regionalized grating is used, no mask is needed, and it is not needed to rotate the substrate during the irradiation procedure. In this way, the different regions of the organic material layer can be irradiated by polarized UV light in one step, improving the manufacturing efficiency, and decreasing the possibility of the uncertainties and errors caused by the rotation and other steps.

Figure 5E:
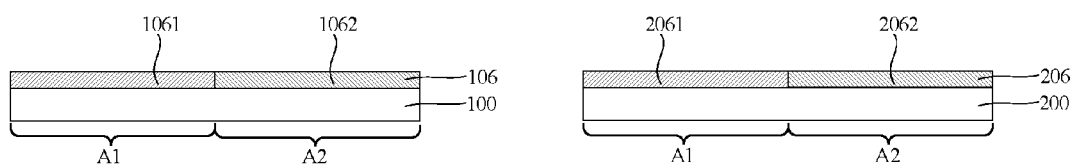

As shown in FIG. 5E, by irradiating the first organic material layer 106' and the second organic material layer 206' with polarized ultraviolet light, the first organic film layer 106 and the second organic layer 206 are formed. The first organic film layer 106 and the second organic layer 206 contains polyimide doped with a dichroic organic dye. During the irradiation procedure, the first transparent substrate 100 and second transparent substrate 200 are relatively rotated, so as to make the substrate and the polarized ultraviolet light have a certain angle, and make the first sub-region A1 and the second region A2 of the first organic film layer 106 and the second organic film layer 206 have different polarization axes.

The portion 1061 of the first organic film layer 106 in the first sub-region A1 has a first polarization axis d1, and the portion 2061 of second organic film layer 206 in a first sub-region A1 has a second polarization axis d2. The first polarization axis d1 and the second polarization axis d2 are substantially vertical to each other. That is, the angle between the first polarization axis d1 and second polarization axis d2 is α, and α=90°. The portion 1062 of the first organic film layer 106 at the second sub-region A2 has a third polarization axis d3, and the portion 2062 of the second organic film layer 206 in the second sub-region A2 has a fourth polarization axis d4. The third polarization axis d3 and the fourth polarization axis d4 are substantially vertical to each other. That is, the angle between the third polarization axis d3 and the fourth d4 polarization axis is β, and β=90°.

In some other embodiments, it is possible to make 89°≤α≤91°, 89°≤β≤91°, −1°≤γ≤1°, −1°≤δ≤1°. With angles within these angle ranges, the first polarization axis d1 and the second polarization axis d2 may be substantially vertical to each other.

Further, the first organic film layer 106 and the second organic film layer 206 have a polarization function, and may be used to replace the prior art polarizing plate and reduce the thickness of the polarizer. As no triacetyl cellulose (TAC) protection layer and adhesive layer is needed, the reliability of the polarizer is improved. Further, as the polarization function can be achieved without the need of stretching, the polarizer is not prone to warping phenomenon.

Although the polymer type and the dichroic dye type are used for illustrative purposes, other type can also be used. For example, an azo dye may be used. In some other embodiments, other dichroic dyes with dichroic ratio larger than seven (7) may be used. For example, the dichroic dye may be any one or more of the dyes such as azo dyes, anthraquinone dyes, biphenyl dyes, triphenylmethane dyes, diazinon and derivatives, single-methine dyes, multi-methine dyes, and polycyclic dyes.

In one embodiment, the first organic film layer and second organic film layer are polyimide doped with an organic a dichroic dye. In some other embodiments, the first organic film layer and a second organic layer may be other polymers doped with an organic dichroic dye. For example, the polymer may be any one of the polymers such as azo group-containing polymer, poly-cinnamoyl derivatives, and polyimide polymer. The pre-polymers of these polymers have photosensitive properties. In the formation process, when the photosensitive pre-polymers of these polymers are irradiated by polarized ultraviolet light, the resulting polymers may be aligned in a certain direction.

Step S3: forming a first alignment layer on the first transparent substrate, and forming a second alignment layer on the second transparent substrate. FIGS. 5F-5I show the corresponding structures.

Figure 5F:
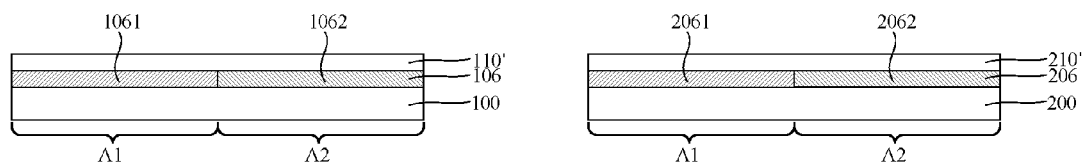

As shown in FIG. 5F, a first alignment material layer 110' is formed on the first transparent substrate 100, and a second alignment material layer 210' is formed on the second transparent substrate 200. The first alignment material layer 110' and the second alignment material layer 210' contain a polyimide prepolymer, and the polyimide prepolymer may be aligned under the radiation of polarized ultraviolet light. Further, the first alignment material layer 110' is formed on the upper surface of the organic film layer 106, and the second alignment material layer 210' is formed on the upper surface of the second organic film layer 206.

Figure 5G:
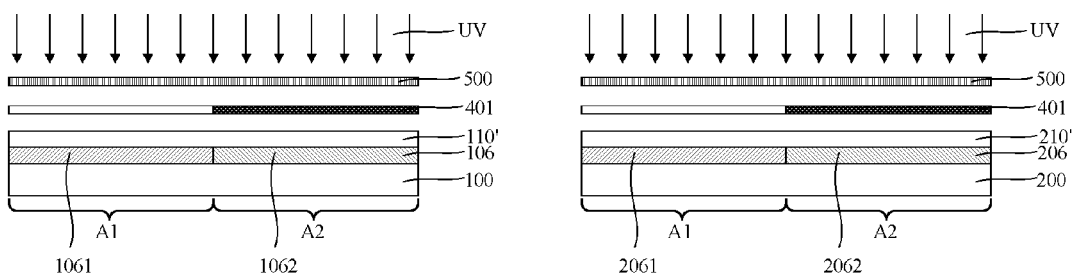
Figure 5H:
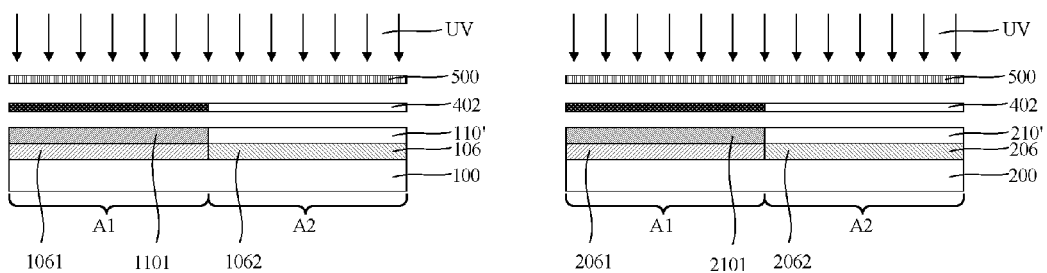

As shown in FIGS. 5G and 5H, the first alignment material layer 110' and the second alignment material layer 210' are, respectively, irradiated by polarized ultraviolet light. Similar to the first organic film layer 106 and the second organic film layer 206, the first sub-regions A1 and the second sub-regions A2 of the first transparent substrate 100 and second transparent 200 are sequentially irradiated by polarized ultraviolet light. Because the irradiation regions are the same as the irradiation regions for the organic film layers, the grating 500, the first mask 401, and the second mask 402 may be used. Because there is no need to replace the grating and masks, the production costs are not increased.

Figure 5I:
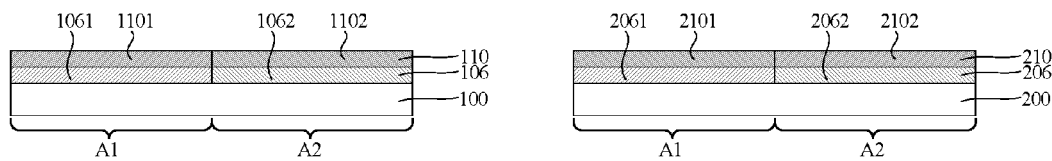

As shown in FIG. 5I, similar to the formation of the organic film layers, by irradiating the first alignment material layer 110' and the second alignment material layer 210' with polarized ultraviolet light, the first alignment layer 110 and the second alignment layer 210 are formed respectively. Because the first alignment material layer 110' on the upper surface of the first organic film layer 106, the first organic film layer 106 and the first alignment layer 110 are sequentially formed on the same side of the first transparent substrate 100. In some other embodiments, the first organic film layer and the first alignment layer may be formed at the two different sides of the first transparent substrate, respectively.

Similarly, the second organic film layer 206 and the second alignment layer 110 are sequentially formed on the same side of the second transparent substrate 200. In some other embodiments, the second organic film layer and the second alignment layer may be formed at the two different sides of the second transparent substrate, respectively.

During the irradiation procedure, the first transparent substrate 100 and second transparent substrate 200 may be relatively rotated, so as to make the substrates have a certain angle with the polarized ultraviolet light, and make the first sub-regions A1 and the second sub-regions A2 of the first organic film layer 106 and the second organic film layer 206 eventually have different polarization axes. Specifically, the portion 1101 of the first alignment layer 110 in the first sub-region A1 and the portion 2101 of the second alignment layer 201 in the first sub-region A1 have a first orientation direction OR1, and the first orientation direction OR1 and the first polarization axis d1 are substantially parallel.

That is, the angle between the first orientation direction OR1 and the first polarization axis d1 is γ, and γ=0°. The portion 1102 of the first alignment layer 110 in the second sub-region A2 and the portion 2102 of the second alignment layer 201 in the second sub-region A2 have a second orientation direction OR2, and the second orientation direction OR2 and the second polarization axis d2 are substantially parallel. That is, the angle between the second orientation direction OR2 and the second polarization axis d2 is δ, and δ=0°.

In one embodiment, the first orientation direction OR1 is substantially parallel to the first polarization axis d1. In some other embodiments, the first orientation direction OR1 may be also substantially parallel to the second axis of polarization d2. That is, the angle between the first orientation direction OR1 and the first polarization axis d1 or the second polarization axis d2 is γ, wherein $-1°\leq\gamma\leq1°$.

In one embodiment, the second orientation direction OR2 is substantially parallel to the third polarization axis d3. In some other embodiments, the second orientation direction OR2 may be also substantially parallel to the fourth polarization axis d4. That is, the angle between the second orientation direction OR2 and the third polarization axis d3 or the fourth polarization axis d4 is δ, and $-1°\leq\delta\leq1°$.

Further, before the first alignment material layer 110' is formed, stripe electrodes are formed on the first transparent substrate 100. The stripe-shaped electrode may be a pixel electrode or a common electrode. In the first sub-region A1 and the second sub-region A2, the stripe-shaped electrode extends along the column direction of the array consisting of a multiple sub-regions. Further, the stripe-shaped electrode is positioned between the first organic film layer 106 and the first alignment layer 110. That is, the first organic film layer 106, the stripe-shaped electrodes and the first alignment layer 110 are sequentially formed on one side of the first transparent substrate 100.

Figure 5J:
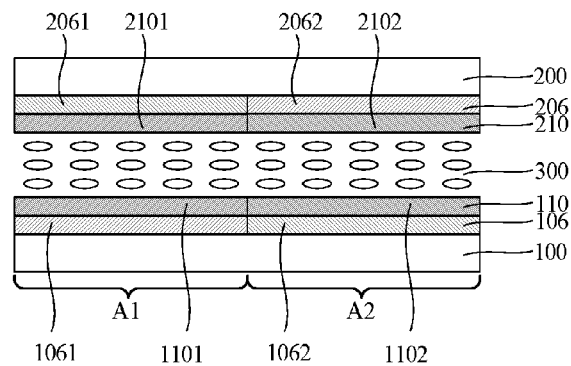

Step S4: aligning and bonding the first transparent substrate and the second transparent substrate. FIG. 5J shows the corresponding structure. Specifically, this step includes forming a liquid crystal layer on the first transparent substrate 100; and aligning and bonding the first transparent substrate 100 and the second transparent substrate 200. The surface of the first transparent substrate 100 configured with the first alignment layer 110 is placed opposite to the surface of the second transparent substrate 200 configured with the second alignment layer 210. In some other embodiments, the liquid crystal layer may be formed on the second transparent substrate 200, and then the first transparent substrate 100 and the second transparent substrate 200 are aligned and bonded.

Further, the first organic film layer and the second organic film layer may be concurrently formed on the first transparent substrate and the second transparent substrate respectively, and the first alignment layer and the second alignment layer are concurrently formed on the first transparent substrate and the second transparent substrate respectively. However, the sequence of the layer formation on the first transparent substrate and the second transparent is not limited.

For example, the first organic film layer and the first alignment layer may be formed on the first transparent substrate first; after the first transparent substrate is completed, the second organic film layer and the second alignment layer are formed on the second transparent substrate; and after the second transparent substrate is completed, the first transparent substrate and the second transparent substrate are aligned and bonded. Alternatively, the second organic film layer and the second alignment layer may be formed on the second transparent substrate first. After the second transparent substrate is completed, the first organic film layer and the first alignment layer are formed on the first transparent substrate and, after the first transparent substrate is completed, the first transparent substrate and the second transparent substrate are aligned and bonded.

According, with the disclosed fabrication process, the first sub-region A1 and the second sub-region A2 have different orientation directions and polarization axes. Therefore, in different viewing directions, the images seen are the effects after the compensation of these two regions. Viewing angle compensation can be achieved in different directions, and is not limited to the electrode shapes, and the viewing angle of the liquid crystal display panel is thus improved.

Further, in one embodiment, the first orientation direction OR1 and the second orientation direction OR2 are symmetrical with respect to the row direction of the array. The liquid crystal display panel may have a symmetrical viewing angle, and a better display effect.

In some other embodiments, the first orientation direction OR1 and the second orientation direction OR2 may be symmetrical with respect to the column direction of the array. Also, the first orientation direction OR1 and the second orientation direction OR2 may be asymmetrical with respect to the row direction of the array. When an asymmetrical structure is used, the stripe-shaped electrodes may be arranged to be asymmetrical with respect to the row direction of the array, such that in the first sub-region A1 and the second sub-region A2, the angle between the first orientation direction OR1 and the stripe-shaped electrodes, and the angle between the second orientation direction OR2 and stripe-shaped electrodes are equal.

Therefore, under a same driving voltage, the liquid crystal molecules in the first sub-region A1 and the second sub-region A2 have a same rotation angle, and so the display unevenness does not appear in the liquid crystal display panel. Using a liquid crystal display panel with an asymmetrical design, the viewing angle compensation may be achieved at different directions, so as to meet different requirements on viewing angles.

The embodiments disclosed herein are exemplary only and not limiting the scope of this disclosure. Various alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. A display panel, comprising:
    a first transparent substrate and a second transparent substrate arranged opposite to the first transparent substrate, wherein the first transparent substrate has a first surface facing the second transparent substrate and an opposing second surface, and the second transparent substrate has a first surface facing the first transparent substrate and an opposing second surface;
    multiple sub-regions arranged in an array, wherein the multiple sub-regions include a first sub-region and an adjacent second sub-region;
    a first organic film layer configured on the first transparent substrate and a second organic film layer configured on the second transparent substrate, wherein the first organic film layer and the second organic film layer comprise a polymer doped with a dichroic organic dye;
    a first alignment layer configured on the first surface of the first transparent substrate, and a second alignment layer configured on the first surface of the second transparent substrate; and
    a liquid crystal layer sandwiched between the first transparent substrate and the second transparent substrate, wherein:
the first organic film layer and the second organic film layer have a first polarization axis and a second polarization axis in the first sub-region, respectively;
the first organic film layer and the second organic film layer have, respectively, a third polarization axis and a fourth polarization axis in the second sub-region; and
the first alignment layer and the second alignment layer each has a first orientation direction in the first sub-region, and the first alignment layer and the second alignment layer each has a second orientation direction in the second sub-region, the first orientation direction being different from the second orientation direction.

2. The display panel according to claim 1, wherein:
the angle between the first polarization axis and the second polarization axis is $\alpha$, and $89°\leq\alpha\leq91°$;
the angle between the third polarization axis and the fourth polarization axis is $\beta$, and $89°\leq\beta\leq91°$;
the angle between the first orientation direction and the first polarization axis or the second polarization axis is $\gamma$, and $-1°\leq\gamma\leq1°$; and
the angle between the second orientation direction and the third polarization axis or the fourth axis polarization axis is $\delta$, and $-1°\leq\delta\leq1°$.

3. The display panel according to claim 2, wherein:
the angle $\alpha$ between the first polarization axis and the second polarization axis is 90°;
the angle $\beta$ between the third polarization axis and the fourth polarization axis is 90°;
the angle $\gamma$ between the first orientation direction and the first polarization axis or the second polarization axis is 0°; and
the angle $\delta$ between the second orientation direction and the third polarization axis or the fourth polarization axis is 0°.

4. The display panel according to claim 1, wherein the first orientation direction and the second orientation direction are symmetrical with respect to a row direction or a column direction of the array.

5. The display panel according to claim 1, further comprising:
a plurality of scan lines and a plurality of data lines configured on the first transparent substrate, wherein the plurality of scan lines and the plurality of data lines intersect with each other and define a plurality of pixel regions;
a switching element configured near the intersection of a scan line and a data line; and
a pixel electrode and a common electrode configured within a pixel region, wherein the pixel electrode and the common electrode comprise at least one stripe electrode.

6. The display panel according to claim 5, wherein the first sub-region and the second sub-region are located within a same pixel region.

7. The display panel according to claim 5, wherein the first sub-region and the second sub-region are located in two adjacent pixel regions.

8. The display panel according to claim 5, wherein the extending directions of the stripe electrodes in the first sub-region and in the second sub-region are symmetrical with respect to a row direction or a column direction of the array.

9. The display panel according to claim 1, wherein the first organic film layer and the second organic film layer comprise a polyimide doped with a dichroic organic dye.

10. The display panel according to claim 1, wherein the dichroic ratio of the dichroic dye is larger than seven (7).

11. The display panel according to claim 1, wherein the first organic film layer is placed between the first transparent substrate and the first alignment layer.

12. The display panel according to claim 1, wherein the second organic film layer is placed between the second transparent substrate and the second alignment layer.

13. A method for manufacturing a display panel, comprising:
providing a first transparent substrate and a second transparent substrate, wherein the first transparent substrate has a first surface facing the second transparent substrate and an opposing second surface, and the second transparent substrate has a first surface facing the first transparent substrate and an opposing second surface, the first transparent substrate and the second transparent substrate have multiple sub-regions arranged in an array, and the multiple sub-regions include a first sub-region and an adjacent second sub-region;
forming a first organic film layer on the first transparent substrate and a second organic film layer on the second transparent substrate, wherein the first organic film layer and the second organic film layer comprise a polymer doped with a dichroic organic dye;
forming a first alignment layer on the first surface of the first transparent substrate, and a second alignment layer on the first surface of the second transparent substrate; and
filling a liquid crystal layer between the first transparent substrate and the second transparent substrate,
wherein:
the first organic film layer and the second organic film layer have a first polarization axis and a second polarization axis in the first sub-region, respectively;
the first organic film layer and the second organic film layer have, respectively, a third polarization axis and a fourth polarization axis in the second sub-region; and
the first alignment layer and the second alignment layer each has a first orientation direction in the first sub-region, and the first alignment layer and the second alignment layer each has a second orientation direction in the second sub-region, the first orientation direction being different from the second orientation direction.

14. The method according to claim 13, wherein:
the angle between the first polarization axis and the second polarization axis is $\alpha$, and $89°\leq\alpha\leq91°$;
the angle between the third polarization axis and the fourth polarization axis is $\beta$, and $89°\leq\beta\leq91°$;
the angle between the first orientation direction and the first polarization axis or the second polarization axis is $\gamma$, and $-1°\leq\gamma\leq1°$; and
the angle between the second orientation direction and the third polarization axis or the fourth axis polarization axis is $\delta$, and $-1°\leq\delta\leq1°$.

15. The method according to claim 13, wherein forming a first organic film layer on the first transparent substrate and forming a second organic film layer on the second transparent substrate further includes:
forming a first organic material layer on the first transparent substrate, wherein the first organic material layer includes a photosensitive prepolymer doped with a dichroic organic dye;
forming a second organic material layer on the second transparent substrate, wherein the second organic layer comprises a photosensitive prepolymer doped with a dichroic organic dye; and irradiating the first organic material layer and the second organic material layer with polarized ultraviolet light, so as to form a first organic film layer and a second organic film layer, respectively.

16. The method according to claim 15, wherein irradiating the first organic material layer and the second organic material layer with polarized ultraviolet light further includes:
   respectively irradiating the first organic material layer and the second organic material layer with the ultraviolet light passing through a grating and a first mask, wherein the first mask has a first light shielding region and a first light-transmitting region, and the first light-transmitting region corresponds to the first sub-region; and
   respectively irradiating the first organic material layer and the second organic material layer with the ultraviolet light passing through the grating and a second mask, wherein the second mask has a second light shielding region and a second light-transmitting region, and the second light-transmitting region corresponds to the second sub-region.

17. The method according to claim 13, wherein forming a first alignment layer on the first transparent substrate and forming a second alignment layer on the second transparent substrate further includes:
   forming a first alignment material layer on the first transparent substrate, and forming a second alignment material layer on the second transparent substrate; and
   irradiating the first alignment material layer and the second alignment material layer with polarized ultraviolet light to form the first alignment layer and the second alignment layer, respectively.

18. The method according to claim 13, wherein:
   the angle $\alpha$ between the first polarization axis and the second polarization axis is 90°;
   the angle $\beta$ between the third polarization axis and the fourth polarization axis is 90°;
   the angle $\gamma$ between the first orientation direction and the first polarization axis or the second polarization axis is 0°; and
   the angle $\delta$ between the second orientation direction and the third polarization axis or the fourth polarization axis is 0°.

19. The method according to claim 13, wherein:
   the first organic film layer and the first alignment layer are successively formed on one surface of the first transparent substrate; and
   the second organic film layer and the second alignment layer are successively formed on one surface of the second transparent substrate.

20. The method according to claim 13, wherein the dichroic organic dye is an organic dye with a dichroic ratio larger than seven (7).

* * * * *